Patented Apr. 11, 1939

2,153,740

UNITED STATES PATENT OFFICE 2,153,740

SPIRIT SOLUBLE BLUE DYES

Paul Whittier Carleton and Harold Edward Woodward, Penns Grove, N. J., assignors to E. I. du Pont de Nemours & Company, Wilmington, Del., a corporation of Delaware No Drawing. Application September 2, 1937, Serial No. 162,138

10 Claims. (Cl. 260—314)

This invention relates to colors of the phthalocyanine series.

It is an object of this invention to prepare colors of the phthalocyanine series which are soluble in alcoholic solvents, and hence suitable for use in coloring pyroxylin lacquers and similar organic solutions. Other important objects of this invention will appear as the description proceeds.

We have found that when sulfonated phthalocyanines are reacted with aryl guanidines to produce salts, the compounds thus obtained are soluble in alcohol and other organic solvents and form a novel and useful series of colors for the dyeing of spirit varnishes, pyroxylin lacquers, and other organic solutions. The novel colors thus obtained are characterized by superior all around properties, combining the bright shades and light fastness of the phthalocyanine colors with good solubility in organic solvents.

As sulfonated phthalocyanines for the above purpose, we may employ phthalocyanines sulfonated to any degree, from mono-sulfo up, according to any known procedure, for instance, according to British Patent No. 322,169, Examples 12 and 14, or according to British Patent No. 457,-796. Also, the phthalocyanine may be metal-free, or metallic, for instance the copper, iron, nickel, aluminum, or zinc compound, and it may be further substituted in the nucleus or not. In general, any compound of the phthalocyanine series containing sulfo or carboxy groups may be employed.

As aryl guanidines, we may use any of the compounds mentioned in Rose, United States Patent 1,674,128; for instance, diaryl-guanidines, such as diphenyl-guanidine, di-ortho-tolyl-guanidine, di-xylyl-guanidine; or triaryl-guanidines, such as triphenyl-guanidine; or mono-aryl-guanidines, for instance, mono-phenyl-guanidines. Best results, however, are obtained with diaryl-guanidines of the benzene series in which the benzene radical carries substituents from the group consisting of methyl and methoxy.

Reaction is best effected by mixing the two components in aqueous solution, the guanidine compound being preferably in the form of a salt, such as its hydrochloride, in which form it is more soluble in water.

Without limiting our invention to any particular procedure, the following examples, in which parts by weight are given, will serve to illustrate our preferred mode of operation.

*Example 1*

15 parts of a sulfonated copper phthalocyanine, containing 2.3 sulfonic groups per molecule of color (prepared by treating 1 part of copper phthalocyanine with 6 parts by weight of 25% oleum at 60° to 70° C., until a sample is soluble in boiling 1% NaOH solution), was dissolved as the sodium salt in 400 parts of water. To this was added a solution of the hydrochloride of 15 parts of di-ortho-tolyl guanidine. The precipitated color was filtered at 58° C. and dried. A blue powder was obtained, which was soluble in alcohol, and the solution was useful for coloring paper, wood and leather. The dyeings thus obtained were a bright greenish blue of good fastness to light. The alcoholic solution was also found useful for coloring nitro cellulose lacquers.

*Example 2*

In a manner similar to Example 1, the di-ortho-tolyl-guanidine salt was made from another sample of sulfonated copper phthalocyanine, containing 1.95 sulfonic acid groups per molecule of color. It gave a spirit soluble blue dye of similar properties to that of Example 1. It was soluble not only in ethyl alcohol but also in methyl alcohol, amyl alcohol, glycerine, acetone and pyridine.

*Example 3*

67 parts of metal-free phthalocyanine-disulfonic acid (prepared by sulfonating metal-free phthalocyanine with 30% oleum at about 70° C.) was dissolved as sodium salt in 3,000 parts of water and precipitated by adding 80 parts of di-ortho-tolyl guanidine dissolved in 800 parts of water with 30 parts of concentrated hydrochloric acid. The guanidine salt was filtered at 50° C. and dried. It was a greenish blue powder of good solubility in alcohol. This alcohol solution was used for coloring paper, wood and leather. The dyeings thus obtained were greener than those from the copper compound and of very good fastness to light.

*Example 4*

The procedure was the same as in Example 3, except that an aqueous hydrochloric acid solution of diphenyl-guanidine was employed in lieu of that of ditolyl guanidine. The product was similar to that in Example 3, but was slightly less soluble and gave slightly darker dyeings.

*Example 5*

6.7 parts of metal-free phthalocyanine-disulphonic acid was dissolved as sodium salt in 500 parts of water and precipitated by adding 10 parts of di-secondary octyl guanidine

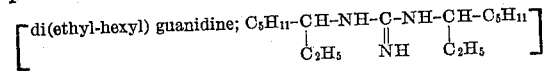

dissolved in 100 parts of methyl alcohol with 2.5 parts of hydrochloric acid (10 normal). The guanidine salt was filtered and dried. It was a blue tarry material soluble in methyl alcohol with a greenish blue color.

Example 6

The procedure was the same as in Example 5, but an alcoholic solution of the hydrochloride of di-cyclohexyl-guanidine was employed in lieu of that of di-secondary octyl-guanidine. The product was a blue powder, soluble in methyl alcohol with a greenish blue color.

Example 7

12 parts of copper phthalocyanine carboxylic acid (as prepared, for instance, from trimellitic acid, cupric chloride and urea, with or without the aid of boric acid; see British Patent Nos. 464,126 and 464,673), were dissolved in 1 liter of water at 90° C. with 5 parts sodium carbonate. The solution was filtered and cooled to 30° C. To one-half of this solution was added a solution of the hydrochloride of 5 parts of di-ortho-tolyl guanidine, and to the other half was added a solution of the hydrochloride of 5 parts of di-ortho-anisyl guanidine. The precipitated guanidine salts of the dye were filtered at 60° C. and dried. The products were blue powders somewhat soluble in methyl alcohol and in glycerine with a blue color.

It will be understood that the above examples are merely illustrative and may be varied widely within the skill of those engaged in this art. Thus, instead of forming the salts of this invention by reacting aqueous solutions of the two components other modes of procedure may be followed. For instance, the free sulfonic acid of the phthalocyanine selected may be treated with an alcoholic solution of the aryl guanidine. The salt may then be recovered by diluting the alcoholic mass with water, or by evaporation and crystallization.

The blue to bluish-green dyes of this invention are superior to other spirit soluble blue dyes now available on the market, in that they have very good solubility in alcohols, and give bright dyeings of good fastness to light even in nitro cellulose lacquers. This fastness to light was not to be predicted, inasmuch as there is no standard relationship as regards fastness between the sodium salt of an average sulfonated dyestuff and its diaryl-guanidine salt. The brightness of shade and good general solubility of our products in organic solvents are likewise outstanding and surprising in their degree.

In the claims below the expressions "compound of the phthalocyanine family", "phthalocyanine coloring matter" and "phthalocyanine compound" shall be understood as referring to a coloring compound possessing the fundamental nuclear structure of phthalocyanine or its metallic derivatives. See for instance, Dent, Linstead and Lowe, Journal of the Chemical Society, London, 1934, pages 1033 to 1037.

We claim:

1. A spirit soluble color composition comprising the salt of an aryl-guanidine and a water soluble phthalocyanine compound selected from the group consisting of sulfonated and carboxylated phthalocyanines.

2. A spirit soluble color composition comprising the salt of an aryl-guanidine and a sulfonated phthalocyanine compound of the group consisting of metallic phthalocyanines and metal-free phthalocyanines.

3. A spirit soluble color composition comprising the salt of a diaryl-guanidine and a sulfonated phthalocyanine coloring matter.

4. A spirit soluble color compound comprising the salt of a diaryl-guanidine of the benzene series, and a sulfonated metal phthalocyanine.

5. A spirit soluble color compound comprising the salt of di-ortho-tolyl-guanidine and sulfonated copper phthalocyanine.

6. A spirit soluble color compound comprising the salt of di-ortho-tolyl-guanidine and sulfonated metal-free phthalocyanine.

7. The process of producing a spirit soluble color of the phthalocyanine series, which comprises forming the salt of an aryl-guanidine and a water soluble phthalocyanine compound selected from the group consisting of sulfonated and carboxylated phthalocyanines.

8. The process of producing a spirit soluble color of the phthalocyanine series, which comprise reacting a sulfonated phthalocyanine compound with a diaryl-guanidine, to form a salt thereof.

9. The process of producing a spirit soluble color of the phthalocyanine series, which comprises reacting an aqueous solution of sulfonated copper phthalocyanine with an aqueous solution of a salt of di-ortho-tolyl-guanidine, and recovering the precipitated salt.

10. The process of producing a spirit soluble color of the phthalocyanine series, which comprises reacting an aqueous solution of sulfonated metal-free phthalocyanine with an aqueous solution of a salt of di-ortho-tolyl-guanidine, and recovering the precipitated salt.

PAUL WHITTIER CARLETON.
HAROLD EDWARD WOODWARD.